United States Patent [19]

Reggio et al.

[11] 4,065,578
[45] Dec. 27, 1977

[54] XYLITOL CHEWING GUM WITH HYDROPHILLIC COLLOID BINDER

[75] Inventors: Richard A. Reggio, Yorktown Heights, N.Y.; Dominick R. Friello, Danbury; John E. Beam, Norwalk, both of Conn.

[73] Assignee: Life Savers, Inc., New York, N.Y.

[21] Appl. No.: 716,928

[22] Filed: Aug. 23, 1976

[51] Int. Cl.² ............................................. A23G 3/30
[52] U.S. Cl. ........................................ 426/3; 426/548; 426/804
[58] Field of Search ........................................ 426/3–6, 426/548

[56] References Cited

U.S. PATENT DOCUMENTS

| | | |
|---|---|---|
| 3,826,847 | 7/1974 | Ogawa et al. ............................ 426/3 |
| 3,899,593 | 8/1975 | Hammond et al. ...................... 426/3 |
| 3,914,434 | 10/1975 | Bohni ................................... 426/548 |
| 3,920,849 | 11/1975 | Marmo et al. .......................... 426/3 |
| 3,930,026 | 12/1975 | Clark ...................................... 426/3 |
| 3,973,041 | 8/1976 | Du Ross ................................. 426/3 |

Primary Examiner—Jeanette M. Hunter
Attorney, Agent, or Firm—Lawrence S. Levinson; Merle J. Smith; Burton Rodney

[57] ABSTRACT

A sugarless chewing gum is provided wherein xylitol is employed as bulk filler and sweetener, and a hydrocolloid, such as xanthan gum or various alginates derived from giant kelp, is employed as a binder between the gum base and xylitol and as a humectant to facilitate retention of moisture in the gum.

14 Claims, No Drawings

XYLITOL CHEWING GUM WITH HYDROPHILLIC COLLOID BINDER

The present invention relates to a xylitol-containing chewing gum which includes a hydrocolloid, such as xanthan gum or alginates derived from giant kelp, to impart continuity to the gum.

The use of xylitol in chewing gum as a substitute for sugar and sorbitol is disclosed in U.S. Pat. No. 3,899,593 to Hammond et al. Xylitol is employed in amounts ranging from 50 to 80% together with glycerol and flavor agents. The resulting chewing gum is said to present a pleasant cooling effect in the mouth.

U.S. Pat. No. 3,914,434 to Bohni discloses non-cariogenic compositions, including chewing gum, containing xylitol in place of sugar.

Unfortunately, where it has been attempted to prepare chewing gum containing large quantities of xylitol, it has been found that the chewing gum produced is dry, tough and generally of low quality.

In accordance with the present invention, a sugarless chewing gum is provided which is formed as a relatively soft, moist, cohesive gum and remains in continuous form even after chewing and is not readily torn apart into discrete pieces during manufacture or after chewing. The sugarless chewing gum of the invention contains gum base, xylitol as the bulk filler-sweetening agent, and a hydrocolloid, preferably a xanthan gum or an alginate derived from giant kelp, which serves as a binder between the gum base and the xylitol and as a humectant to hold moisture in the gum. The chewing gum may also optionally include other fillers, such as calcium carbonate; texturizers, such as hydrated alumina; emulsifiers or softeners, such as lecithin, fatty acids or glycerine; plasticizers, coloring agents, flavors, other non-sugar sweetening agents, and other conventional chewing gum additives employed in the manufacture of sugarless chewing gums as will be apparent to one skilled in the art.

The xylitol which imparts bulk, sweetness and a pleasant cooling effect is employed in an amount within the range of from about 50 to about 70%, and preferably from about 55 to about 65% by weight of the chewing gum.

The hydrocolloid comprises xanthan gum, carageenan, various alginates derived from giant kelp, preferably low calcium sodium alginates (for example KELCO-GEL LV, KELCOSOL and KELTONE, all trademarks of KELCO Company), as well as sodium alginates, ammonium alginates, potassium alginates, propylene glycol alginates and the like. The hydrocolloid will be employed in an amount within the range of from about 0.03 to about 1.0%, and preferably from about 0.05 to about 0.1% by weight of the chewing gum. The hydrocolloid will preferably be employed in the form of a viscous gel-like solution formed by mixing the hydrocolloid with an amount of water to provide a solution containing from about 0.5 to about 5.0% by weight hydrocolloid. Use of the hydrocolloid in the form of a solution facilitates mixing of the hydrocolloid with the xylitol, gum base and other ingredients of the chewing gum and increases moisture content and thus imparts softness to the gum.

The xylitol will normally be employed in a weight ratio to the hydrocolloid (for example, xanthan gum) in a range of from about 60:1 to about 2000:1, and preferably from about 500:1 to about 1500:1 in order to impart the desired cohesiveness to the final gum product.

The chewing gum will include a relatively water-insoluble, water-impenetrable gum base in an amount ranging from about 8 to about 50%, and preferably from about 15 to 35% by weight of the chewing gum composition.

In general, the gum base is prepared by heating and blending various ingredients, such as, natural gums, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadienestyrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

| Base I | Parts by Weight |
| --- | --- |
| Ester gum | 88 |
| Rubber latex solids | 10 |
| Lecithin | 2 |
| Base II | |
| Chicle | 30 |
| Jelutong | 60 |
| Gutta soh | 8 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum with or without conventional preservatives.

In addition, as mentioned hereinbefore, the xylitol may be employed together with other artificial sweeteners such as poorly water-soluble as well as water-soluble sweeteners, such as sorbitol, mannitol, the free acid form of saccharin, sodium, calcium or ammonium saccharin salts, dihydrochalcones, glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscorephyllum cumminsii* (Serendipity Berry), free cyclamic acid and cyclamate salts, and the like, or mixtures of any two or more of the above.

The sugarless chewing gum of the invention may be prepared by simply mixing the xylitol, hydrocolloid, for example, xanthan solution and the other various ingredients thereof with the gum base employing techniques well known in the art.

The following examples represent preferred embodiments of the present invention. cl EXAMPLE 1

A sugarless chewing gum is prepared from the following ingredients.

|  | Parts by Weight |
|---|---|
| Gum base | 32.5 |
| Xylitol | 60 |
| Lecithin | 1.5 |
| Xanthan solution (xanthan gum-1% water-99%) | 5 |
| Flavor | 1 |

The gum base is melted (180° F) and placed in a standard dough mixer equipped with sigma blades. Lecithin, xanthan solution and xylitol are added and the mixture is mixed for 10 minutes to form a continuous cohesive product.

The sugarless chewing gum so formed is found to be relatively soft and moist and have a pleasant sweet-cool taste and remains as a continuous gum during and after chewing.

EXAMPLE 2

A sugarless chewing gum is prepared from the following ingredients employing the procedure described in Example 1.

|  | Parts by Weight |
|---|---|
| Gum base | 33.0 |
| Xylitol | 59.5 |
| Lecithin | 1.5 |
| Alginate solution* | 5.0 |
| Flavor | 1.0 |

*Kelco brand Kelcosol Algin (Low-calcium sodium alginate)-2% and water 98%.

The sugarless chewing gum so formed is found to be relatively soft and moist and have a pleasant sweet-cool taste and remains as a continuous gum during and after chewing.

What is claimed is:

1. A sugarless chewing gum in the form of a soft, moist, continuous cohesive gum, which comprises gum base, xylitol as a bulk filler and sweetener, and a hydrocolloid selected from the group consisting of xanthan gum or an alginate derivative of kelp as a binder to facilitate formation of the soft, moist, continuous cohesive gum, said hydrocolloid being present in an amount within the range of from about 0.03 to about 1.0% by weight of said chewing gum.

2. The sugarless chewing gum as defined in claim 1 wherein said xylitol is present in an amount within the range of from about 50 to about 70% by weight.

3. The sugarless chewing gum as defined in claim 2 wherein the xylitol is present in a weight ratio to the hydrocolloid of within the range of from about 60:1 to about 2000:1.

4. The sugarless chewing gum as defined in claim 1 further including a softener.

5. The sugarless chewing gum as defined in claim 4 wherein said softener is lecithin.

6. The sugarless chewing gum as defined in claim 1 wherein said hydrocolloid comprises xanthan gum.

7. The sugarless chewing gum as defined in claim 6 wherein said xanthan gum is in the form of a viscous aqueous gel-like solution.

8. The sugarless chewing gum as defined in claim 1 wherein said hydrocolloid comprises an alginate derivative of kelp.

9. The sugarless chewing gum as defined in claim 8 wherein said alginate derivative is selected from the group consisting of calcium-sodium alginates, sodium alginates, ammonium alginate, potassium alginates, propylene glycol alginates and mixtures thereof.

10. The sugarless chewing gum as defined in claim 8 wherein said alginate derivative is calcium-sodium alginate.

11. A method of preparing the sugarless chewing gum as defined in claim 1, which comprises melting the gum base, adding the hydrocolloid and xylitol to the melted gum base with mixing to form a continuous gum mass, and cooling to form a chewing gum.

12. The method as defined in claim 11 wherein said hydrocolloid is xanthan gum.

13. The sugarless gum as defined in claim 1 wherein said xylitol is employed with a non-sugar sweetener.

14. The sugarless gum as defined in claim 13 wherein said non-sugar sweetener is sorbitol.

* * * * *